Feb. 5, 1952     C. J. GREEN     2,584,799
VARIABLE RATIO POWER TRANSMISSION
Filed Feb. 15, 1949
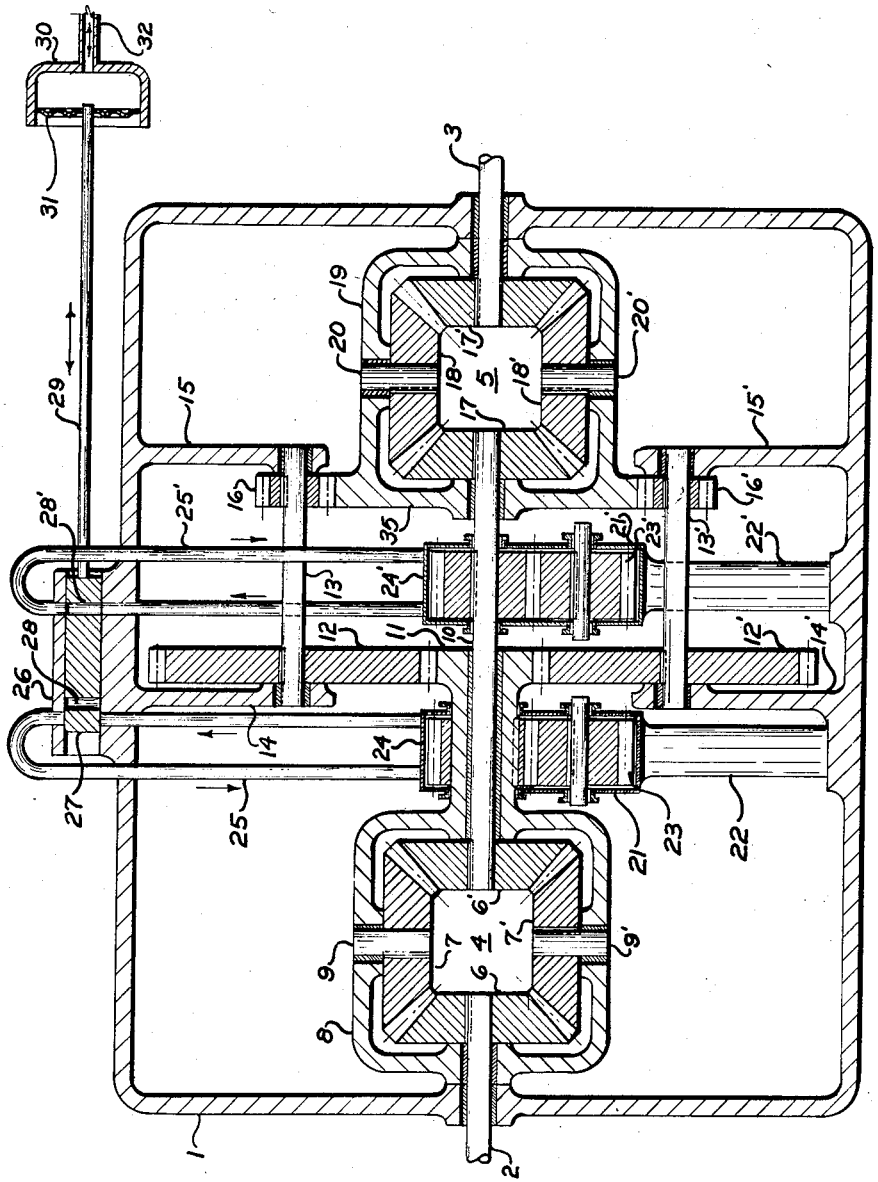
INVENTOR.
Carl J. Green Patented Feb. 5, 1952

2,584,799

UNITED STATES PATENT OFFICE 2,584,799

VARIABLE RATIO POWER TRANSMISSION

Carl J. Green, Oak Ridge, Tenn.

Application February 15, 1949, Serial No. 76,459

6 Claims. (Cl. 74—756)

This invention relates to power transmission apparatus of the continuously variable ratio type, that is, the type wherein the ratio of the speed of the output shaft to the speed of the input shaft is continuously variable over a wide range. Such a variable ratio power transmission necessarily provides also a continuously variable ratio of output torque to input torque. Accordingly, a variable ratio power transmission of this type has general application wherever it is desired to drive a load having changing torque requirements from an engine which it is desired to operate at substantially a constant speed. The most common example of this type of requirement is provided by an automobile powered by a gasoline engine, and it is in connection with such an automobile power drive that the invention is specifically described. It will be understood, however, that the invention has equal application to other types of power drives having similar requirements. For example, the present invention could provide the power drive for rock crushers, grinders, pulverizers, cranes, derricks, hoists, tractors, combines, threshers, etc.

Applicant's invention involves the provision of two gear trains constituting two parallel channels or paths for the flow of power between the input shaft and the output shaft. The two gear trains are characterized by having different gear ratios, preferably one gear train having a one-to-one ratio and the other preferably being speed reduction gearing having a gear ratio of perhaps fifty to one. The two power transmission channels have their respective origins in the outputs of a differential gearing system, the input to which is driven from the main power drive shaft. The two power transmission channels terminate at another differential gearing system the two inputs to which are driven respectively thereby. The output of the last mentioned differential gearing system drives the power take-off or output shaft of the overall variable transmission of the present invention. These two inputs of the last mentioned differential gearing system tend to drive the output in the same direction.

Thus, the input power to the variable transmission divides and flows to the output of the variable transmission along two separate power paths or channels having different gear ratios. The division of the power along the two paths, that is, the ratio of power flowing along the two paths is variable. Since the gear ratios of the two paths differ one from the other, the overall effective gear ratio between the input and the output of the transmission is also variable and is determined by the division of power flow between the two paths, which division in turn is determined by the torque requirements of the load. For example, when a high torque is required to turn the load, most of the power flows through the path constituting reduction gearing. Under such conditions, the gear ratio of the transmission as a whole will be influenced primarily by the gear ratio of the reduction gearing path and the required high torque at a low speed will be provided at the output of the transmission.

The ratio of power flow between the two paths is constrained or coerced by external influences to the proper value at which the output torque of the transmission is just sufficient to overcome the load. The external influences are applied as two brakes of one form or another, one associated with, and applying an external torque to, each of the two gear trains through which the power divides. Preferably the brakes consist of hydraulic pumps having their outputs connected back to their inputs through associated hydraulic resistance paths, the relative resistances of which may be controlled manually, or automatically in response to a physical quantity, such as the intake manifold pressure, which varies with the torque requirements of the load.

Accordingly, it is the principal object of the present invention to provide an improved variable speed ratio power transmission.

Another object of the present invention is to provide a variable ratio power transmission wherein the output shaft is positively connected to the input shaft through gearing and mechanical apparatus only.

Still another object of the present invention is to provide a variable ratio power transmission wherein the flow of power between input and output shafts is divided between two power paths having individually different gear ratios.

A further object of the present invention is to provide a variable ratio power transmission wherein the flow of power between input and output shafts is divided between two power paths having individually different gear ratios, and the ratio of power flow along the two paths is automatically varied by externally applied restraints automatically controlled in accordance with the output torque requirements of the load.

A still further object of the present invention is to provide a variable ratio power transmission wherein the flow of power between input and output shafts is divided between two power paths having individually different gear ratios, and the ratio of power flow along the two paths is controlled by means of auxiliary external torques applied to elements of said paths, whereby the overall gear ratio of the transmission may be varied in accordance with said ratio.

Other objects and advantages of the present invention will become apparent from the following detailed description and the accompanying drawings.

In the drawings, the figure is an elevation view in section of the variable speed power transmission of the present invention.

Referring now to the figure, reference numeral one designates the main stationary housing for the variable speed power transmission of the present invention. Entering at the left of housing 1 through a suitable bearing is the input shaft 2 which will be understood to be driven from the power source, such as the gasoline engine of an automobile. Emerging from the right hand side of housing 1 through a suitable bearing is the output shaft 3 which it will be understood may be connected to drive a load, such as the drive wheels of an automobile.

Within housing 1, and at the left thereof, is a differential gearing system indicated generally at 4. Differential gearing system 4 is illustrated as the conventional bevel gear type differential gearing system having two axially spaced bevel gears 6, 6', and, at right angles thereto, and engaging therewith, two transversely spaced bevel gears 7, 7'. Bevel gears 7, 7' are keyed to shafts 9, 9', respectively, both of which shafts are journalled in the differential housing 8 for rotation about a transverse axis. The input shaft 2 is keyed to bevel gear 6, and an intermediate shaft 10 is keyed to bevel gear 6'. Differential housing 8 is journalled for rotation about shaft 2 and intermediate shaft 10.

Also within housing 1, and at the right side thereof, is a differential gearing system indicated generally at 5. Differential gearing system 5 is also conventional and is shown, for purposes of illustration, as a bevel type differential gearing system having axially spaced bevel gears 17, 17', and, at right angles thereto and engaging therewith, two transversely spaced bevel gears 18, 18'. Shafts 20, 20' are keyed to bevel gears 18, 18', respectively, and these shafts are journalled in differential housing 19 for rotation about a transverse axis. Intermediate shaft 10 is keyed to bevel gear 17, and the output shaft 3 is keyed to bevel gear 17'. Differential housing 19 is journalled for rotation about intermediate shaft 10 and output shaft 3.

Formed integrally with differential housing 8 is a spur gear 11. Engaging spur gear 11 is a wheel gear 12, which is keyed to shaft 13. Also keyed to shaft 13 is a spur gear 16, which gear engages a wheel gear 35. Gear 35 is formed integrally with differential housing 19. Shaft 13 may be journalled for rotation in suitable supports 14 and 15 formed integrally with the main transmission housing 1. It will be apparent that the gearing consisting of gears 11, 12, 16, and 35 constitutes a speed reduction gear train connecting differential housing 8 and differential housing 19, whereby rotation of differential housing 8 causes rotation of differential housing 19 at a reduced speed and an increased torque. Although not necessary for operability, in order to maintain symmetry and reduce undesired vibration and dynamic instability of the transmission, there is provided opposite the just described speed reduction gear train consisting of gears 11, 12, 16, and 35, an identical speed reduction gear train, the elements of which are given the same reference numerals primed.

The input to differential gearing system 4 is provided by the rotation of input shaft 2, whereas the rotation of differential housing 8 and the rotation of intermediate shaft 10 constitute its two outputs. Differential gearing 5 has two inputs consisting of the rotation of intermediate shaft 10 and the rotation of differential housing 19, whereas its single output consists of the rotation of output shaft 3. It will be apparent that the flow of power from input shaft 2 to output shaft 3 may proceed along either or both of two paths, the outer one of which paths consists of differential housing 8, spur gear 11, wheel gear 12, shaft 13, spur gear 16, wheel gear 35, and differential housing 19, and the inner one of which paths consists of bevel gear 6', intermediate shaft 10, and bevel gear 17.

In order to show that the flow of power through these two power paths tends to drive output shaft 3 in the same direction, the rotation of the various shafts and gears will be followed through upon the assumption that input shaft 2 is rotated in a clockwise direction. The rotation of all shafts will be considered from the standpoint of an observer at the extreme right of Fig. 1. The flow of power through the outer path may best be visualized if it is assumed that shaft 10 is held stationary. Upon this assumption, bevel gears 6', and 17 are also necessarily stationary. Accordingly, when input shaft 2 rotates in a clockwise direction, differential housing 9 also rotates in a clockwise direction, as does spur gear 11. Wheel gear 12 and spur gear 16 are thus caused to rotate in a counterclockwise direction, and wheel gear 21 and differential housing 19 are caused to rotate in a clockwise direction. Rotation of differential housing 19 in a clockwise direction, of course, produces rotation of output shift 3 in a clockwise direction. Thus, the outer path of power flow tends to produce rotation of output shaft 3 in the same direction as the rotation of input shaft 2.

In order to determine the effect of the inner path of power flow, it is convenient to consider that differential housings 8 and 19 are held stationary. In this case, when input shaft 2 and bevel gear 6 are rotated in a clockwise direction, bevel gear 6' will rotate in a counterclockwise direction by virtue of the reversing effect of bevel gears 7, 7'. Bevel gear 6' carries with it intermediate shaft 10 and bevel gear 17, all of which, of course, also rotate in a counterclockwise direction. Rotation of bevel gear 17 in a counterclockwise direction produces rotation of bevel gear 17' and output shaft 3 in a clockwise direction by virtue of the reversing action of bevel gears 18, 18'. Thus, flow of power through the inner power path also tends to produce rotation of the output shaft 3 in the same direction as that of the input shaft 2.

It will be apparent, therefore, that when input shaft 2 is rotated in any given direction, flow of power through either of the two power paths tends to produce rotation of the output shaft 3 in the same direction as each other and the same direction as shaft 2. In other words, the effects of the two power paths are additive.

Since the outer power path includes a speed reduction gear train having a gear ratio preferably in the order of fifty to one while the inner power path is simply a direct drive having a one to one ratio, it will be apparent that the overall effective gear ratio of the transmission as a whole will be determined by the relative amounts of power flowing along the two paths, that is by the ratio of the power flowing along the outer path to the power flowing along the inner path. When substantially all of the power is flowing along the inner path, the situation corresponds to high gear wherein the speed and torque of output shaft 3 are comparable to the speed and torque of input shaft 2. However, when substantially all of the power is flowing along the outer power path, the situation corresponds to low gear wherein the speed of output shaft 3 is much less than that of input shaft 2 and the torque of output shaft 3 is much greater than that of input shaft 2.

In accordance with the principles of the invention, means are provided for exerting external torques upon elements of the two parallel paths of power flow whereby the relative amounts of power flowing through the two paths may be controlled. In order to exert these external torques, positive action hydraulic pumps 21, 21' are provided, these two pumps being identical and of any conventional positive acting type. They are illustrated as the well known gear type of pump consisting of driving gears 24, 24' and idler gears 23, 23'. These pumps may be suitably supported, as at 22, 22' from the main transmission housing.

As shown, the driving gear 24 of pump 21 is keyed to, and driven by, a hollow extension of differential housing 8. Thus, when input shaft 2 is driven in a clockwise direction, the resultant clockwise rotation of gear 24 and the resultant counterclockwise rotation of idler gear 23 builds up a hydraulic pressure at the near side of the casing of pump 21. This near side of the casing then forms the output of the pump, while the far side of the casing forms the input of the pump.

In a similar manner, the driving gear 24' of pump 21' is keyed to intermediate shaft 10 so as to be driven by it. When input shaft 2 rotates in a clockwise direction, the resultant counterclockwise rotation of driving gear 24' and the resultant clockwise rotation of idler gear 23' builds up a hydraulic pressure on the far side of the casing of pump 21'. This far side then forms the output of the pump while the near side forms the input of the pump. Suitable oil bearing seals may be employed, as shown, where the hollow extension of differential housing 8 enters the casing of pump 21 and where intermediate shaft 10 enters the casing of pump 21'. It will be understood that suitable oil reservoirs and surge tanks may be provided as needed in the two hydraulic systems in accordance with accepted principles in the hydraulic pumping and transmission art.

Pipe 25 interconnects the input and output of pump 21, and pipe 25' interconnects the input and output of pump 21', these pipes forming an external hydraulic flow channel for the associated pump.

A double valve 26, which may be formed integrally with the main transmission housing, is provided to control the hydraulic load imposed upon pumps 21, 21'. Valve 26 includes a linearly movable control member 27, which member carries two ports 28, 28' which are adapted to align themselves with pipes 25, 25', respectively. A linearly movable control shaft 29 controls the position of control member 27. Ports 28, 28' are so spaced along member 27 that when port 28' is entirely aligned with pipe 25' port 28 is entirely out of alignment with pipe 25, as shown. Similarly, if control shaft 29, which is now shown in its rightmost position, is moved to its leftmost position, wherein port 28 is entirely aligned with pipe 25, port 28' is entirely out of alignment with pipe 25'. At intermediate positions of control shaft 29, ports 28, 28' are both partially aligned with the associated pipes 25, 25'.

It will be apparent that movement of control shaft 29 varies the relative hydraulic loads imposed upon pumps 21, 21', which in turn varies the relative speeds of differential housing 8 of the outer path of power flow and intermediate shaft 10 of the inner path of power flow, which in turn varies the relative amounts of power flowing along the outer and inner paths of power flow. In this manner, the overall effective gear ratio of the whole transmission may be quickly and positively controlled by controlling the position of control shaft 29. For instance in the rightmost position of control shaft 29 shown, the hydraulic load imposed upon pump 21 is at a maximum and the hydraulic load imposed upon pump 21' is at a minimum. Thus, flow of power along the outer path of power flow is effectively prevented by the braking effect of pump 21, and substantially all of the power flows along the inner path of power flow. This position therefore corresponds to high gear. Conversely, if control shaft 29 is moved to its leftmost position wherein port 28 is in alignment with pipe 25, flow of power along the inner path of power flow is prevented by virtue of the braking action imposed by pump 21', and substantially all of the power will flow along the outer path of power flow. Such a situation would correspond to low gear.

Instead of manually controlling shaft 29, it may be positioned automatically from the vacuum of the intake manifold of the gasoline engine. Thus, a vacuum chamber 30 may be provided, as shown, having a resilient flexible diaphragm 31 which is connected to and controls the movement of control shaft 29. A pipe 32 communicates at one end with the interior of vacuum chamber 30, and is adapted to be connected at its other end to the intake manifold of the gasoline engine.

As is well known, when the torque requirements of an automobile are low, a high vacuum exists in the intake manifold. In such a case, the diaphragm 31 is pulled to its rightmost position, as shown, such that the transmission operates in a manner corresponding to high gear, as previously described. When the load upon the automobile is high, the vacuum at the intake manifold is small, and the diaphragm 31 is permitted to return to its normal leftmost position. As previously described, in the leftmost position of control shaft 29, the operation of the transmission corresponds to low gear.

An alternate method of automatically positioning control shaft 29 would be in response to the speed of the load, that is, in accordance with the rate of rotation of output shaft 3. This could be specifically accomplished, for example, by means of a governor connected to be driven from shaft 3, the speed responsive output member of the governor being connected to control the position of shaft 29.

It will be appreciated that the effect of the pumps 21, 21' is to quickly and positively coerce the transmission to adjust to the proper ratio of power flow between the two paths and then maintain the proper ratio without any hunting or oscillation. It will be apparent that the desired overall result may be obtained with the omission of one or the other of the pumps 21, 21', the only detriment being the sacrifice of some degree of rapidity of response to changing loads and some degree of stability.

Since many changes could be made in the above construction, and many apparently widely different embodiments of this invention could be made without departing from the scope thereof, it is intended that all matter contained in the above description, or shown in the accompanying drawings, shall be interpreted as illustrative, and not in a limiting sense. In particular, it will be understood that any of the well known types of differential gearing system may be substituted for the bevel type differential gearing systems 4 and 5 without affecting the essential operating characteristics of the transmission. Also it should be stressed that the external torques applied to elements of the two paths of power flow by means of positive action hydraulic pumps 21, 21', may be applied by other means, such as other types of hydraulic pumps, friction braking means, or by electric generators feeding adjustable loads.

What is claimed is:

1. A variable ratio power transmission comprising an input shaft, an output shaft, two bevel type differential gearing assemblies disposed in axially spaced relation, each of said assemblies consisting of a rotatable housing containing one pair of spaced bevel gears coaxial with respect to said input and output shafts and another pair of spaced bevel gears engaging said first pair and journalled in the associated rotatable housing for rotation about a transverse axis, a rigid connection between said input shaft and the first coaxial gear of said first assembly, an intermediate shaft connecting the second coaxial gear of said first assembly and the first coaxial gear of said second assembly, a rigid connection between the second coaxial gear of said second assembly and said output shaft, and a speed reduction gear train for driving the rotatable housing of said second assembly in the same direction as the rotatable housing of said first assembly, said gear train having its input element connected to be actuated by the rotatable housing of said first assembly and its output element connected to actuate the rotatable housing of said second assembly, and means for applying a variable braking force to the second coaxial gear of said first assembly.

2. A variable ratio power transmission comprising a main transmission housing, an input shaft entering centrally at one end of said transmission housing, an output shaft emerging centrally at the opposite end of said transmission housing, two bevel type differential gearing assemblies disposed in axially spaced relation within said housing, each of said assemblies consisting of a rotatable housing containing one pair of spaced bevel gears coaxial with respect to said input and output shafts and another pair of spaced bevel gears engaging said first pair and journalled in the associated rotatable housing for rotation about a transverse axis, a rigid connection between said input shaft and the first coaxial gear of said first assembly, an intermediate shaft connecting the second coaxial gear of said first assembly and the first coaxial gear of said second assembly, a rigid connection between the second coaxial gear of said second assembly and said output shaft, and a speed reduction gear train for driving the rotatable housing of said second assembly in the same direction as the rotatable housing of said first assembly, said gear train having its input element connected to be actuated by the rotatable housing of said first assembly and its output element connected to actuate the housing of said second assembly, the rotatable housing of said first assembly being journalled on said input shaft and said intermediate shaft, and the rotatable housing of said second assembly being journalled on said intermediate shaft and said output shaft, and means for applying a variable braking force to the second coaxial gear of said first assembly.

3. A variable ratio power transmission comprising an input shaft, an output shaft, a first differential gearing system consisting of an input element and two output elements, a rigid connection between said input shaft and the input element of said first differential gearing system, a second differential gearing system consisting of two input elements and an output element, mechanical connections between the two output elements of said first differential gearing system and the two input elements of said second differential gearing system, respectively, one of said last mentioned mechanical connections consisting of a speed reduction gear train, a rigid connection between the output element of said second differential gearing system and said output shaft, two positive action pumps, respective driving connections between the two output elements of said first differential gearing system and said two pumps, two hydraulic transmission channels associated respectively with said two pumps and interconnecting the input and output of the associated pump, two valves associated respectively with said two channels, each of said valves having associated therewith a movable control element for adjusting the opening of the respective valves, and a single control member forming a mechanical connection between said two control elements for defining their relative positions, said control member and said elements being so arranged that in the intermediate position of said control member both valves are fifty percent open and movement of said control member from its intermediate position increases the percentage opening of one of said valves and decreases the percentage opening of the other.

4. A variable ratio power transmission comprising an input shaft, an output shaft, a first differential gearing system consisting of an input element and two output elements, a rigid connection between said input shaft and the input element of said first differential gearing system, a second differential gearing system consisting of two input elements and an output element, mechanical connections between the two output elements of said first differential gearing system and the two input elements of said second differential gearing system, respectively, one of said last mentioned mechanical connections consisting of a speed reduction gear train, a rigid connection between the output element of said second differential gearing system and said output shaft, two positive action pumps, respective driving connections between the two output elements of said first differential gearing system and said two pumps, two hydraulic transmission channels associated respectively with said two pumps and interconnecting the input and the output of the associated pump, two valves associated respectively with said two channels, each of said valves having associated therewith a movable control element for adjusting the opening of the respective valves, and a single control member forming a mechanical connection between said two control elements for defining their relative positions, said control member and said elements being so arranged that in the intermediate position of said control member both valves are fifty percent open and movement of said control member from its intermediate position increases the percentage opening of one of said valves and decreases the percentage opening of the other, a vacuum chamber, a flexible diaphragm associated with said vacuum chamber and movable in response to variations in the vacuum in said chamber, and means interconnecting said control member and said diaphragm.

5. A variable ratio power transmission for an automobile comprising an input shaft adapted to be driven from the gasoline engine of the automobile, an output shaft adapted to drive the wheels of the automobile, a first differential gearing system consisting of an input element and two output elements, a rigid connection between said input shaft and the input element of said first differential gearing system, a second differential gearing system consisting of two input elements and an output element, mechanical connections between the two output elements of said first differential gearing system and the two input elements of said second differential gearing system, respectively, one of said last mentioned mechanical connections consisting of a speed reduction gear train, a rigid connection between the output element of said second differential gearing system and said output shaft, two positive action pumps, respective driving connections between the two output elements of said first differential gearing system and said two pumps, two hydraulic transmission channels associated respectively with said two pumps and interconnecting the input and the output of the associated pump, two valves associated respectively with said two channels, each of said valves having associated therewith a movable control element for adjusting the opening of the respective valves, and a single control member forming a mechanical connection between said two control elements for defining their relative positions, said control member and said elements being so arranged that in the intermediate position of said control member both valves are fifty percent open and movement of said control member from its intermediate position increases the percentage opening of one of said valves and decreases the percentage opening of the other, a vacuum chamber, a flexible diaphragm associated with said vacuum chamber and movable in response to variations in the vacuum in said chamber, means interconnecting said control member and said diaphragm, and a pipe communicating at one end with said vacuum chamber and adapted to be connected at the other end to the intake manifold of the automobile.

6. A variable ratio power transmission for a gasoline engine automobile comprising a main transmission housing, an input shaft entering centrally at one end of said housing and adapted to be driven from the gasoline engine of the automobile, an output shaft emerging centrally at the opposite end of said transmission housing and adapted to drive the wheels of the automobile, two bevel type differential gearing assemblies disposed in axially spaced relation within said housing, each of said assemblies consisting of a rotatable housing containing one pair of spaced bevel gears coaxial with respect to said input and output shafts and another pair of spaced bevel gears engaging said first pair and journalled in the associated rotatable housing for rotation about a transverse axis, a rigid connection between said input shaft and the first coaxial gear of said first assembly, an intermediate shaft connecting the second coaxial gear of said first assembly and the first coaxial gear of said second assembly, a rigid connection between the second coaxial gear of said second assembly and said output shaft, and a speed reduction gear train having its input element connected to be actuated by the rotatable housing of said first assembly and its output element connected to actuate the housing of said second assembly, the rotatable housing of said first assembly being journalled on said input shaft and said intermediate shaft, and the rotatable housing of said second assembly being journalled on said intermediate shaft and said output shaft, two positive action pumps, a driving connection between one of said rotatable housings and one of said pumps, a driving connection between the second coaxial gear of said first assembly and the other of said pumps, two hydraulic transmission channels associated respectively with said two pumps and interconnecting the input and the output of the associated pump, two valves associated respectively with said two channels, each of said valves having associated therewith a movable control element for adjusting the opening of the respective valves, and a single control member forming a mechanical connection between said two control elements for defining their relative positions, said control member and said elements being so arranged that in the intermediate position of said control member both valves are fifty percent open and movement of said control member from its intermediate position increases the percentage opening of one of said valves and decreases the percentage opening of the other, a vacuum chamber, a flexible diaphragm associated with said vacuum chamber and movable in response to variations in the vacuum in said chamber, means interconnecting said control member and said diaphragm, and a pipe communicating at one end with said vacuum chamber and adapted to be connected at the other end to the intake manifold of the automobile.

CARL J. GREEN.

REFERENCES CITED

The following references are of record in the file of this patent:

UNITED STATES PATENTS

| Number | Name | Date |
| --- | --- | --- |
| 1,317,272 | Dailey | Sept. 30, 1919 |
| 1,328,767 | Granzow | May 4, 1920 |
| 1,619,703 | Chorlton | Mar. 1, 1927 |
| 1,957,578 | Cook | May 8, 1934 |
| 1,961,619 | McClain et al. | June 5, 1934 |
| 2,046,468 | La Fountain | July 7, 1936 |
| 2,181,647 | Wheaton | Nov. 28, 1939 |
| 2,186,108 | Holloway | Jan. 9, 1940 |
| 2,187,737 | Gregory | Jan. 23, 1940 |
| 2,198,398 | Szekely | Apr. 23, 1940 |
| 2,251,625 | Hale | Aug. 5, 1941 |
| 2,469,779 | Valle | May 10, 1949 |